Nov. 3, 1959
S. D. SESSIONS
2,910,777
SIGNALLING COMPARATOR
Filed Jan. 25, 1957
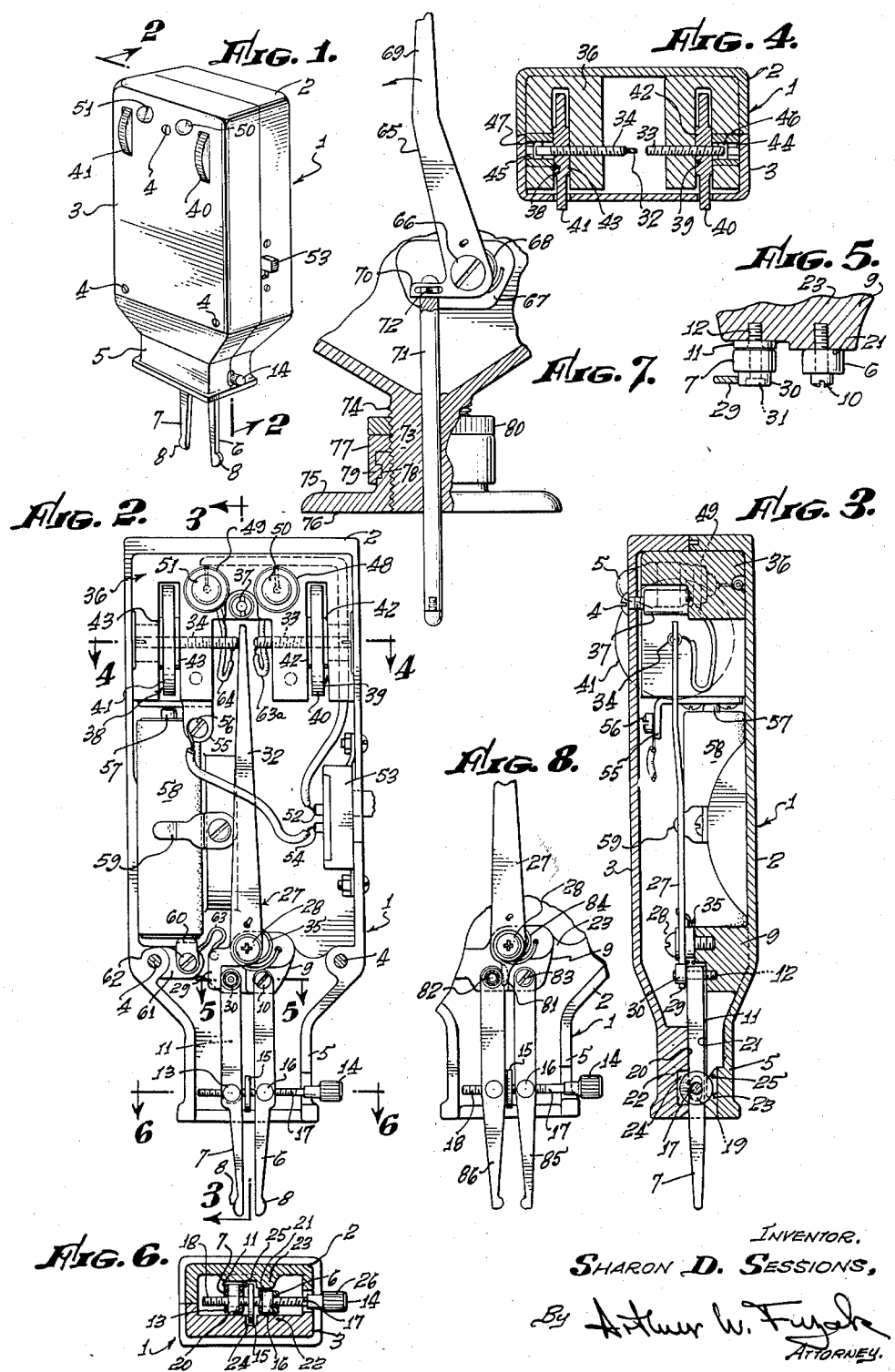
INVENTOR.
SHARON D. SESSIONS,
By Arthur W. Fry
ATTORNEY.

United States Patent Office 2,910,777
Patented Nov. 3, 1959

2,910,777

SIGNALLING COMPARATOR

Sharon D. Sessions, Ontario, Calif., assignor to Zetetic Incorporated, Ontario, Calif., a corporation of California Application January 25, 1957, Serial No. 636,306

4 Claims. (Cl. 33—148)

This invention relates to measuring instruments and is more particularly concerned with a comparator, capable of precision measurement, which clearly signals any nonconformance of a dimension to specified tolerances.

Most instruments in commercial use for making precision measurements are precision machined and assembled as a necessary prerequisite to satisfactory service. The concepts utilized in such devices make the degree of precision attainable a function of the degree of precision employed in manufacturing the measuring instrument. Consequently, such devices are extremely costly and are delicate in operation and serviceability.

Furthermore, and more importantly, these instruments require the skill of an experienced precision inspector for any certainty in accuracy of measurement. Wherever a vernier scale must be read to obtain the results of a particular measurement, a subjective factor is introduced which in effect controls the precision attained in the measurement. In addition, turning down a micrometer until the feelers contact the surfaces between which it is desired to measure can be accomplished in such manner, even with devices having friction thimbles, that inconsistent readings can be obtained by the inexperienced or careless worker.

It has thus become necessary, in those industries where a single machined element may have many hundreds of surfaces which must be measured to tolerances within a few ten-thousandths of an inch, to employ highly skilled technicians to machine and otherwise process the element and to inspect it. These technicians must use extreme care without regard to the time spent in performing their duties. The result is the addition of a large increment to the cost of each part produced.

Another problem frequently encountered is the assumption of engineering responsibility by the precision inspector where a particular dimension is out of tolerance, to what the inspector considers an insignificant degree. The result may be structural failure or rejection of the element after further costly processing.

There are, of course, devices known to the art which obviate some of the foregoing difficulties through utilization of signalling elements electrically circuited for operation upon actuation of their caliper arms or spindles. Such devices do not completely solve the problems of exclusively mechanical devices and in addition introduce further difficulties. Most such devices are complex in construction and hence costly to manufacture. In addition, the more successful of these are specifically designed for permanent installation to give a single comparative measurement. None combine simplicity of structure and hence economy of manufacture with portability and accuracy of reproducible comparative measurement. Furthermore, while such devices provide for adjustment to specified tolerances they fail to provide for adjustability to nominal dimensions with any degree of simplicity and rapidity.

It is therefore a principal object of my invention to provide a measuring instrument or comparator which obviates the foregoing defects of, and difficulties encountered through use of, known measuring devices.

It is another object of my invention to provide a simply and inexpensively constructed signalling comparator having a positive signal transmitted in response to nonconformance of a dimension measured.

It is a further object of my invention to provide a precision measuring, signal transmitting comparator which does not require precision machining or assembly in order to insure consistent accuracy of results.

An additional object of my invention is to furnish an inexpensive, portable measuring device in which the feeler surfaces which contact the work surfaces may be rapidly and accurately set to a wide range of nominal dimensions.

Another object is to provide a signalling comparator in which a relative movement of the contact surfaces of the feelers is multiplied through mechanical linkage to give a greatly increased linear displacement of a pivoted signal actuator contact arm.

These as well as further objects of my invention will become apparent from consideration of the following description as related to the drawing in which:

Figure 1 is a perspective view of my comparator;

Figure 2 is a plan view taken on line 2—2 of Figure 1 with the cover removed;

Figure 3 is a sectional view along line 3—3 of Figure 2;

Figure 4 is a view in section taken on line 4—4 of Figure 2 illustrating the configuration of the axially adjustable contact screws;

Figure 5 is a sectional view along line 5—5 of Figure 2 showing the feeler arm-pivoted contact bar structure;

Figure 6 is another view in section, but taken on line 6—6 of Figure 2 and showing the configuration of my feeler arm adjustment assembly;

Figure 7 is a partial plan view of my device, adapted for depth comparison with sections exposed, and Figure 8 is a partial plan view of my device as adapted for comparative measurement of outside dimensions.

As illustrated in these drawings, my comparator is housed within a casing 1 having a base 2 and cover 3 secured together as by screws 4. This casing is shown as rectangular in cross-section except for a flared open neck portion 5, through which adjustable work contact elements or feeler arms 6 and 7 protrude. These arms are curved at their ends in order to provide smooth contace surfaces 8. Feeler arm 6 is directly pivoted to a boss 9 of casing base 2 with the cap screw 10. Feeler arm 7 is indirectly pivoted thereto through the pivot arm 11, which is journaled at one end to boss 9 by pin 12 and pivoted at its other end to feeler arm 7 by the pin 13. The function of the arm 11 is to maintain the same radius of rotation for the feeler arm 7 about the pin 12 as for the feeler arm 6 about the cap screw 10 when these feeler arms are adjusted to different nominal dimensions. As will be evident from the description which follows, arm 11 permits the feeler arms to be varied from any given nominal spacing of the contact points of work contact surfaces 8 without permitting longitudinal displacement of feeler arm 7 with respect to feeler arm 6.

The feeler arms 6 and 7 are adjustable to a substantial range of nominal dimensions by virtue of a lead screw assembly. The compound lead screw 14 of this assembly has an annular key 15, secured thereto at the approximate midpoint of the screw shank, and is oppositely threaded on either side of this key. A pin 16 is journaled to feeler arm 6 so that its axis is parallel to the axis of screw 10 and perpendicular to the axis of lead screw 14. This pin is drilled and threaded to engage and receive the threaded section 17 of the lead screw 14. The pin 13, pivoted to feeler arm 7 and pivot arm 11, is similarly drilled and oppositely threaded to engage and receive the threaded section 18 of the lead screw. Feeler arms 6 and 7 are each provided with elongated slots, as illustrated at 19 in Figure 3, on each side of the pins 13 and 16 in order to permit effective circumferential displacement of the contact surfaces 8 during adjustment to a nominal dimension and to permit deflection from this nominal dimension during comparative measurement.

Bearing surfaces 20 and 21 of bosses 22 and 23, which are respectively integral with casing sections 2 and 3, are provided to maintain the feeler arms in a substantially constant lateral plane. Bosses 22 and 23 are notched at 24 and 25 to furnish bearing surfaces which serve to retain lead screw 14 against longitudinal travel when the knurled head 26 of the lead screw is rotated.

It will be evident that by virtue of the foregoing novel lead screw assembly I have made it possible to adjust the feeler arms to the desired nominal dimension without disassembling the feeler arms from the casing, and more importantly, without altering the radius of rotation of the feeler arms during such adjustment.

A contact lever 27, which may be straight but is preferably Z shaped, is rotatably secured to the boss 9 by a screw 28, at a point adjacent to screws 10 and 12 but spaced equally therefrom. The shorter arm or tab 29 of the lever is contacted and actuated by the bearing 30, secured, as by screw 31, to feeler arm 7. The end of the longer arm 32 of the lever is positioned between axially aligned contact screws 33 and 34 and is urged in contact with screw 34 as by compression spring 35 secured to arm 32 and boss 9. In addition, when the comparator is positioned in contact with a work piece which is to be gaged, spring 35 constitutes means for urging the lever tab 29 in contact with the non-work contact, or internal end of feeler 7.

A U-shaped insert 36 which is constructed of plastic or any suitable insulating material is provided for retention of contact screws 33 and 34 and is secured to casing base 2 by the slotted screw 37, which also receives cover screw 4. This insert is provided wiht a pair of slots 38 and 39 parallel to the sides of the U and is drilled perpendicularly to these sides to guide the contact screws 33 and 34. A pair of similar adjusting nuts 40 and 41 are each drilled and threaded to receive one of the contacting screws and are furnished with annular bosses 42 and 43 which serve as bearing surfaces against the sides of slots 38 and 39. Exteriorly of these adjusting nuts, the insert is provided with diametrically opposed slotted recesses 44 and 45 which receive and engage key sections 46 and 47 of contact screws 33 and 34. It will be evident that by this construction these contact screws may be axially adjusted to vary the spacing between them.

The U-shaped insert is also provided with a pair of sockets 48 and 49 which receive signal bulbs 50 and 51, one of which 51, is preferably red and the other, 50, white. The base of each socket is electrically connected to one terminal 52 of a switch 53. The other terminal, 54, of this switch is wired through a contact 55, secured as by screw 56 to one end of the insert, to a terminal 57 of battery 58. The battery is retained within casing base 2, as by spring clip 59.

The other end of the battery is securely retained against a contact member 60 fixed to a boss 61 of the casing base by screw 62. The lead 63 connects contact member 60 with contact lever 27. Adjustable contact screw 33 has a lead 63a connecting it to the annular terminal of socket 48 while screw 34 similarly has a lead 64 connecting it to the annular terminal of socket 49.

It will thus be apparent that when the lever arm 27 is in contact with adjusting screw 34, as illustrated, and switch 53 is closed, the red bulb 51 will be on. Similarly, when arm 27 is in contact with screw 33, the white bulb 50 will go on.

The depth comparator, illustrated in part in Figure 7, is similar in all respects to that described above except for the element shown. In this form, contact lever 65 is pivoted in pin 66 secured to boss 67. A compression spring 68, similar to spring 35, is fixed to the contact lever 65 and to the boss 67 to urge the lever arm 69 in a counterclockwise direction against adjusting screw 34. The lever tab 70 is linked to an adjustable work contact element or feeler rod 71 by the pin 72 in such manner as to permit conversion of the reciprocatory movement of the rod into the pendulum motion of lever arm 69. It will be apparent that the spring 68 also constitutes means for urging the lever tab 70 in contact with the internal end of feeler arm 71 when a comparative measurement is made. Rod 71 extends through the cylindrical neck 73, threaded at 74, to receive a further adjustable work contact element in the form of an annular member 75 having a reference plane 76, perpendicular to rod 71. Annular member 75 is engaged by an adjusting nut 77 in any suitable manner as by the annular slot 78 and key 79 arrangement shown. A lock nut 80 is threaded to neck 73 to coact with the adjusting nut 77 in locking the reference plane in the desired position.

The embodiment of my invention which may be utilized for determination of conformance to outside dimensions is illustrated in Figure 8 and is identical to the form shown in Figures 1 through 6 in all respects except as noted below. In this form lever tab 81 is located intermediately of bearing 82 and screw 83. Spring 84 is a tension spring instead of a compression spring thus urging the bearing 82 in a counterclockwise direction and constituting means for urging lever tab 81 in contact with the internal end of feeler 86 when a comparative measurement is being made. Feeler arms 85 and 86 have their contact surfaces mutually adjacent. Lights 50 and 51 as shown in Figure 2 may be reversed, if desired, so that the red light 51 will be on when the part gaged is too small.

In the operation of my inside diameter comparator adjusting screws 33 and 34 are first extended inwardly their maximum distance of travel in order to center lever arm 32, by turning adjusting nut 41 clockwise and adjusting nut 40 counterclockwise. The distance between the contact surfaces of feeler arms 6 and 7 is then adjusted, by turning the lead screw 14, to conform to the nominal dimension as previously set on a micrometer or as standardized on a gage block. It will be noted that because feeler arm 7 is pivoted to arm 11 through pin 13 and since the latter arm is pivoted about the pin 12 to the boss 9, there will be no longitudinal displacement of the arm 7 with respect to the arm 6 and hence the contact point of bearing 30 with tab 29 will not vary as a result of adjustment to different nominal dimensions. Hence, the effective leverage of feeler arm 7 upon the tab 29 about the screw 28 remains constant for every nominal dimension within the range of the comparator and consequently no error in comparative measurement results from resetting the nominal dimension. The adjusting screws are then retracted completely into the insert 36 by turning the adjusting nuts 40 and 41 respectively in clockwise and counterclockwise directions. My comparator is set to maximum tolerance desired by inserting feeler arms 6 and 7 between the preadjusted anvils of a micrometer and extending adjusting screw 34 inwardly by turning adjusting nut 41 clockwise until signal light 51 goes on. Setting to the minimum tolerance desired is accomplished by inserting the feeler arms between the preadjusted anvils of a micrometer and extending adjusting screw 33 inwardly by turning adjusting nut 40 counterclockwise until signal light 50 goes on. Red light 51 will remain on as long as switch 53 is closed and so long as lever arm 32 is free to react to spring 35.

In gaging a dimension to determine its conformance to the desired tolerance, my comparator is gripped by the casing and the feelers 6 and 7 positioned within the hole.

If the hole conforms to tolerances the feeler arms will be actuated inwardly a sufficient distance to remove lever arm 32 from contact with adjusting screw 34 but an insufficient distance to cause it to contact adjusting screw 35 and no light will be on. If the hole is oversize, lever arm 32 will remain in contact with adjusting screw 34 and red light 51 will be on, while if the hole is undersize lever arm 32 will be placed in contact with adjusting screw 33 and white light 50 will go on. The operation of the depth comparator and the outside diameter comparator are similar to that discussed above and will be apparent from the foregoing.

It will be evident that a positive indication of conformance or nonconformance of a dimension to specified tolerances is immediately given. The subjective elements governing present commercial inspection are completely eliminated with the result that individual judgments, which may be faulty, are no longer required. Furthermore, once my comparator is set as desired, the time required to make a large number of determinations regarding conformance is very substantially reduced.

It should further be noted that utilization of the concepts disclosed results in an ability to obtain a high mechanical advantage. A minute increment of movement of feeler arm 7 with respect to arm 6 results in a large increment of displacement of lever arm 32 at its contact position. This of course permits precision measurement, without requiring manufacture of my comparator to precision tolerances. There is therefore a consequent decrease in cost and an increase in reliability.

While I have illustrated by invention by reference to the preferred forms, various modifications will become apparent to those skilled in the art which do not depart from the concepts of my invention as claimed. For example, the battery 58 and signal lights 50 and 51 may be removed from the casing and retained within a separate casing in order to reduce the size and weight of my comparator without departing from my invention. Other minor changes and variations will be clear to the skilled artisan.

I claim:

1. A signalling comparator comprising a casing, a first and a second work contact element having spaced apart work contact surfaces exteriorly of said casing, a pivot arm pivoted at one end to said casing, said second work contact element being pivoted to said casing at a point of near adjacency to the point of securement of said pivot arm to said casing, each said work contact element being provided with a pin journaled thereto, said pivot arm being pivoted at its other end to said first work contact element by the said pin journaled thereto, a lead screw threadedly engaging each said pin and extending transversely of the longitudinal axes of said work contact elements, a key fixed to said screw and engaging said casing whereby rotation of said screw results in relative displacement of one of said work contact elements with respect to the other, an elongate contact arm pivoted to said casing at a point adjacent to one of its ends to define a lever tab and a lever arm longer than said lever tab, said lever tab extending adjacent to and cooperatively engaging and bearing upon the internal end of said first work contact element, a pair of axially aligned contact screws axially adjustably mounted in said casing, a pair of adjusting nuts threadedly engaging said contact screws, the free end of said lever arm being intermediately adjacent said contact screws, means for urging said free end of the lever arm in contact with one of said contact screws and for urging said lever tab in contact with said internal end of said first work contact element and means for signalling contact of said lever arm with each of said contact screws.

2. The signalling comparator of claim 1 in which said lever tab is adjacent to said first work contact element on a side of said first work contact element opposite from said second work contact element.

3. A signalling comparator comprising a casing, a first and a second elongate feeler arm adjustably secured to said casing and having spaced apart work contact surfaces exteriorly of said casing, said first feeler arm being pivoted at its midsection to one end of an elongate pivot arm, said pivot arm being pivoted at its other end to said casing, said second feeler arm being pivoted to said casing, lever means pivoted to said casing at a point adjacent to and spaced equally from the pivot points to said casing of said second feeler arm and said pivot arm, said lever means cooperatively engaging and bearing upon the internal end of said first elongate feeler arm, a pair of opposed adjustably spaced contact elements mounted in said casing, each of said contact elements being on an opposite side of said lever means, means for urging said lever means in contact with one of said contact elements, lead screw means in threaded engagement with said feeler arms to adjust the spacing between the work contact surfaces of said feeler arms and means for signalling contact of said lever means with each of said contact elements.

4. The signalling comparator of claim 3 in which said lever means has a short lever tab adjacent to said first feeler arm on a side of said first feeler arm opposite from said second feeler arm.

References Cited in the file of this patent

UNITED STATES PATENTS

| Number | Name | Date |
|---|---|---|
| 454,516 | Brown | June 23, 1891 |
| 1,133,300 | McGauley | Mar. 30, 1915 |
| 1,520,263 | Schlaupitz | Dec. 23, 1924 |
| 1,827,702 | Kooyoomjian | Oct. 13, 1931 |
| 2,000,502 | Weikel | May 7, 1935 |
| 2,011,931 | Dreyer | Aug. 30, 1935 |
| 2,254,313 | Poock et al. | Sept. 2, 1941 |
| 2,433,585 | Warner | Dec. 30, 1947 |
| 2,569,564 | Gulliet | Oct. 2, 1951 |
| 2,579,569 | Hauck et al. | Dec. 25, 1951 |

FOREIGN PATENTS

| Number | Country | Date |
|---|---|---|
| 74,645 | Switzerland | Mar. 16, 1917 |
| 595,480 | Germany | Apr. 14, 1934 |
| 836,573 | Germany | Apr. 15, 1952 |